Figure 1:
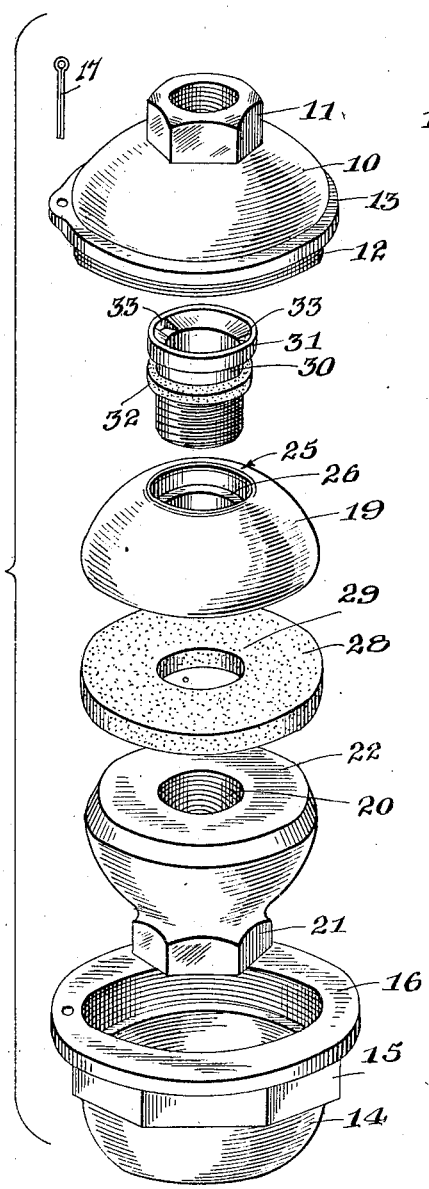

March 10, 1931. W. C. WHITE 1,795,811
FLEXIBLE PIPE JOINT
Filed Oct. 26, 1927

Inventor
W. C. White
By Lacey & Lacey,
Attorneys

Patented Mar. 10, 1931

1,795,811

UNITED STATES PATENT OFFICE

WALTER C. WHITE, OF LOS ANGELES, CALIFORNIA, ASSIGNOR TO INTERNATIONAL COUPLERS CO., OF PITTSBURGH, PENNSYLVANIA, A COMMON-LAW TRUST

FLEXIBLE PIPE JOINT

Application filed October 26, 1927. Serial No. 228,957.

This invention relates to an improved flexible pipe joint particularly designed for use in connection with fluid pressure systems and has as one of its principal objects to provide a joint especially adapted for heavy work.

The invention has as a further object to provide a joint of the ball and socket type wherein the ball will be formed of coacting sections one of which will provide a follower for the joint packing interposed between the sections and wherein the sections will be rigidly locked together so as to prevent any dislocation of the follower when subjected to extreme frictional drag within the socket.

The invention has as a further object to provide a joint wherein the follower will be adjustably connected to the body section of the ball so that the follower may be taken up from time to time for feeding the packing to the wall of the socket.

And a still further object of the invention is to provide a joint wherein the coupling member employed to adjustably connect the sections of the ball will be of such nature as to provide a continuation of the fluid passage through the ball.

Figure 2:
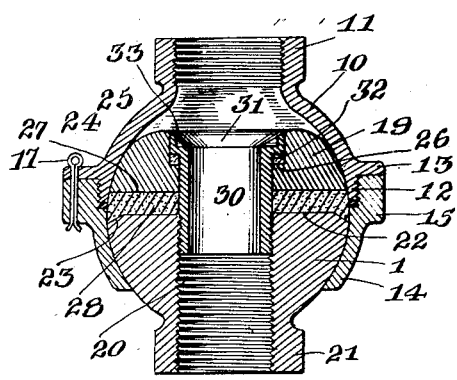
Figure 3:
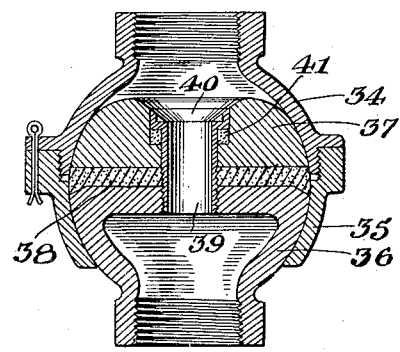
Figure 4:
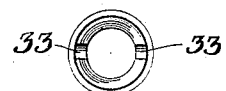

Other and incidental objects will appear hereinafter. In the drawings:

Figure 1 is a perspective view showing my improved joint disassembled, the parts, however, being in proper relative position, Figure 2 is a sectional view showing the joint assembled, Figure 3 is a sectional view showing a slight modification of the invention, and Figure 4 is a plan view showing the type of coupling member employed in connection with the preferred construction as well as in connection with the modified construction.

The joint of the present invention is of the ball and socket type. For convenience, I shall first describe the socket. This socket includes a socket cup 10 which is provided with a pipe nipple 11. Formed on the cup is an annular flange 12, at the inner end of which is arranged a radial stop shoulder 13 and threaded upon said flange is an annular socket nut 14 conforming to the contour of the cup. The socket nut is provided with an enlarged wrench receiving portion 15 which is surmounted by a flange 16 abutting the stop shoulder 13 and removably engaging through said shoulder, the flange, and the wrench receiving portion, is a key 17 locking the cup and nut together.

Snugly engaging within the socket is the joint ball, the socket being machined so that close fitting contact will be had between the ball and socket. The ball is of sectional construction and includes a substantially semispherical body section 18 with which coacts a cap section 19 conforming at its outer face to the spherical contour of the ball. Formed through the body section is a fluid passage or bore 20 at the outer end of which the section is provided with a pipe nipple 21. At the inner end of this passage the section is formed with a flat face 22 lying at substantially right angles to the axis of the passage and surrounding said face at the periphery of the section is a beveled shoulder 23 inclining away from the cap section 19. This cap section is provided centrally with a bore 24 registering with the passage 20 and of equal diameter and the outer end portion of said bore is counterbored to provide a recess 25 defining a shoulder 26 at its junction with the bore. The cap section is further provided with a flat inner end face 27 confronting the flat face 22 of the body section 18 and lying at substantially right angles to the axis of the bore 24.

Interposed between the flat faces 22 and 27 of the ball sections is a packing 28 provided centrally with an opening 29 corresponding in diameter to the diameter of the passage 20 and bore 24 respectively and registering therewith. This packing may be formed of any approved material but is compressible. At its periphery the packing conforms to the spherical outline of the ball while the outer margin of the packing overlies the shoulder 23, it being noted that the packing is of a thickness to complete the spherical shape of the ball.

Removably fitting snugly through the bore 24 of the cap section 19 and threaded into the inner end portion of the passage 20 of the body section 18 of the ball is a tubular coupling member 30. The passage 20 is shown as threaded its full length. This is done merely to facilitate the threading operation. At its upper end the coupling member is formed with an annular overhanging head or flange 31 which snugly fits within the recess 25 of the cap section and interposed between said head and the shoulder 26 is an annular gasket or packing 32 surrounding the coupling member. This gasket, like the packing 28, may be formed of any approved material but is compressible as well as subject to swelling, due to liquid absorption. Thus, the gasket 24 while being compressed by the head 23 will also swell to further insure a constantly sealed joint between the coupling member and cap section so that fluid under pressure within the joint cannot enter between the coupling member and cap section to flow through the bore to the inner side face of the section at the packing 28. As will be clear, the coupling member will provide a continuation of the fluid passage 20 through the ball and, as will be observed, the cap section 19 is adapted to slide upon the coupling member axially thereof toward the body section 18 of the ball. The cap section is thus adapted to provide a follower for the packing 28 so that fluid pressure will act upon the follower for compressing said packing and forcefully feeding it against the wall of the socket to provide a sealed joint between the ball and socket. The shoulder 28 will, of course, assist in this feeding action of the packing and owing to the presence of said shoulder an increased area of the packing will be presented to the socket wall to thus insure the effective sealing of the joint. In this connection, the importance of providing a swelling gasket between the head of the coupling member and the follower becomes apparent since this gasket must accommodate itself to the sliding movement of the follower as otherwise, fluid pressure would enter between the follower and coupling member, as previously indicated, to neutralize its action at opposite sides of the follower. Notwithstanding the fact that the follower is slidable upon the coupling member, it will be seen that the coupling member will rigidly lock the follower and body section together to move in unison so that the follower cannot be dislocated even under extreme frictional drag against the socket wall. The joint is accordingly particularly adapted for heavy work. Formed in the head 31 of the coupling member are, as particularly shown in Figure 4, oppositely disposed wrench receiving notches 33 in which a spanner wrench may be engaged for rotating the coupling member and adjustably positioning the follower from time to time against the packing 28. Thus, the follower may be positively advanced against the packing for taking up any undue looseness which may develop therebetween as well as positively compressing the packing and feeding it against the wall of the socket. In this way, the packing may be impinged against the socket wall with such pressure as is desired to the end that a tight joint will be insured notwithstanding the conditions under which the joint is used.

In Figure 3 of the drawings, I have illustrated a slight modification of the invention. In this figure the socket cup is indicated at 34 and the socket nut at 35, the body section of the ball is indicated at 36, and the cap section or follower at 37. Interposed between the sections is a packing 38 and coupling the sections to move in unison is a coupling member 39 provided with a head 40 coacting with a gasket 41. All of these parts are identical with similar parts of the preferred construction with the exception that the body section 36 of the ball is cored out for reducing the weight thereof as well as increasing the area presented to the action of the fluid pressure for accordingly enhancing the tightness of the joint. Otherwise, the structural details of the modification correspond to the preferred construction and cooperate in a similar manner.

Having thus described the invention, what is claimed as new is:

1. A flexible pipe joint including a ball formed of coacting sections, a socket receiving the ball, a packing interposed between the ball sections to cooperate with the wall of the socket, one of said ball sections being movable relative to the other, a tubular coupling member having one end threaded within one section and having intimate sliding engagement through the other section for locking the ball sections together to move in unison, and means surrounding the other end of the coupling member and coacting with the movable ball section to provide a sealed joint therebetween.

2. A flexible pipe joint including a ball provided with a fluid passage and formed of coacting sections, a socket receiving the ball, a packing interposed between the ball sections to cooperate with the wall of the socket, one of the ball sections being movable relative to the other and adapted to provide a follower for said packing, a tubular coupling member slidably fitted in the follower and threaded in the portion of the passage in the other ball section for locking the sections of the ball together to move in unison while permitting movement of the follower against the packing to feed the packing to the wall of the socket, said coupling member providing a continuation of the fluid passage through the ball, and having an overhanging terminal flange and an expansible gasket interposed between the flange and the follower to provide a sealed joint therebetween.

In testimony whereof I affix my signature.

WALTER C. WHITE. [L. S.]